United States Patent
Himmelhuber et al.

(10) Patent No.: US 12,443,857 B2
(45) Date of Patent: Oct. 14, 2025

(54) METHOD AND SYSTEM FOR SEMI-AUTOMATED GENERATION OF MACHINE-READABLE SKILL DESCRIPTIONS OF PRODUCTION MODULES

(71) Applicant: Siemens Aktiengesellschaft, Munich (DE)

(72) Inventors: Anna Himmelhuber, Maxhütte-Haidhof (DE); Sonja Zillner, Berlin (DE); Stephan Grimm, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 929 days.

(21) Appl. No.: 17/240,460

(22) Filed: Apr. 26, 2021

(65) Prior Publication Data

US 2021/0334670 A1 Oct. 28, 2021

(30) Foreign Application Priority Data

Apr. 27, 2020 (EP) .................................. 20171599

(51) Int. Cl.
*G06N 5/02* (2023.01)
*G06N 20/00* (2019.01)

(52) U.S. Cl.
CPC .............. *G06N 5/02* (2013.01); *G06N 20/00* (2019.01)

(58) Field of Classification Search
None
See application file for complete search history.

(56) References Cited

U.S. PATENT DOCUMENTS

2009/0293045 A1 11/2009 Cheriton
2010/0070448 A1* 3/2010 Omoigui ............. H10F 39/1825
706/55
(Continued)

FOREIGN PATENT DOCUMENTS

CN 103235549 A 8/2013
CN 106250201 A 12/2016
(Continued)

OTHER PUBLICATIONS

Lehmann, Jens, et al., "Class expression learning for ontology engineering," Journal of Web Semantics 9.1 (2011), pp. 71-81; 2011; 25 pages.

(Continued)

*Primary Examiner* — Haimei Jiang
(74) *Attorney, Agent, or Firm* — Schmeiser, Olsen & Watts LLP

(57) ABSTRACT

Production logs and industrial ontologies are processed with an inductive logic program performing class expression learning in order to create class expressions, with each class expression representing a constraint or property of a skill of a production module. The resulting class expressions are ordered by a metric to form an ordered recommender list and displayed to a user for postprocessing. The user selects suitable class expressions from the ordered recommender list, so that the system can build a machine-readable skill description with the selected class expressions. This approach to generating formal, machine-readable skill descriptions minimizes the labor time and domain expertise needed to equip production modules with their skill description. Selecting the correct class expression from the automatically generated ordered recommender list is a much lower effort than manual labeling from scratch.

6 Claims, 3 Drawing Sheets

| Class Expresssions ||| |
|---|---|---|---|
| # | Class Expresssion | Pred. Acc. | |
| 1. | involvesMaterial only (MaterialProductBase or BottomPart) | 100.00% | |
| 2. | hasPositionParam only (pos1 or pos2) | 100.00% | |
| 3. | Thing | 40.82% | |
| 4. | involvesMaterial max 1 Thing | 40.82% | |
| 5. | involvesMaterial max 1 PartType3 | 40.82% | |
| 6. | involvesMaterial max 1 PartType2 | 40.82% | |
| 7. | involvesMaterial max 1 PartType1 | 40.82% | |
| 8. | involvesMaterial max 1 HeadPart | 40.82% | |
| 9. | involvesMaterial max 1 BottomPart | 40.82% | |
| 10. | involvesMaterial max 1 MaterialProductBase | 40.82% | ⤹RL |
| 11. | involvesMaterial max 1 zero | 40.82% | |
| 12. | involvesMaterial max 1 pos5 | 40.82% | |
| 13. | involvesMaterial max 1 pos4 | 40.82% | |
| 14. | involvesMaterial max 1 pos3 | 40.82% | |
| 15. | involvesMaterial max 1 pos2 | 40.82% | |
| 16. | involvesMaterial max 1 pos1 | 40.82% | |
| 17. | involvesMaterial max 1 hundredeighty | 40.82% | |
| 18. | hasOrientationParam only (hundredeighty or zero) | 40.82% | |
| 19. | pos1 or (involvesMaterial max 1 Thing) | 40.82% | |
| 20. | hundredeighty or (involvesMaterial max 1 Thing) | 40.82% | |

(56) References Cited

U.S. PATENT DOCUMENTS

| | | | |
|---|---|---|---|
| 2014/0282586 A1* | 9/2014 | Shear | G06F 16/245 |
| | | | 718/104 |
| 2015/0169746 A1* | 6/2015 | Hatami-Hanza | G06N 5/022 |
| | | | 706/18 |
| 2016/0034305 A1* | 2/2016 | Shear | G06F 9/50 |
| | | | 707/722 |
| 2017/0140322 A1 | 5/2017 | Kozloski et al. | |
| 2018/0158010 A1* | 6/2018 | Greenberger | G06Q 10/063112 |
| 2018/0292797 A1* | 10/2018 | Lamparter | G06F 16/144 |
| 2020/0026265 A1 | 1/2020 | Gocev et al. | |
| 2020/0218858 A1* | 7/2020 | Sawyer | G06F 18/214 |
| 2021/0040442 A1* | 2/2021 | Rajagopal | A61K 9/0073 |
| 2021/0309965 A1* | 10/2021 | Haining | C12N 15/86 |

FOREIGN PATENT DOCUMENTS

| | | |
|---|---|---|
| CN | 109492745 A | 3/2019 |
| EP | 3598378 A1 | 1/2020 |
| WO | 2016080964 A1 | 5/2016 |

OTHER PUBLICATIONS

Loskyll, Matthias et al., "Context-based orchestration for control of resource-efficient manufacturing processes," Future Internet 4.3 (2012), pp. 737-761; 2012; 25 pages.

Horridge, Matthew, et al., "Manchester Syntax for OWL 1.1.," in: OWLED (Spring), Citeseer, 2008; 2008; 10 pages.

Bühmann, Lorenz, et al., "DL-Learner—A Framework for Inductive Learning on the Semantic Web," in: Journal of Web Semantics 39 (2016); 11 pages.

Tran, An C., et al., "Parallel Symmetric Class Expression Learning," Journal of Machine Learning Research, Jan. 31, 2017, pp. 1-34, XP055729834, Retrieved from the Internet: URL:https://www.jmlr.org/papers/volume18/14-317/14-317.pdf; 34 pages.

* cited by examiner

FIG 4

| | Class Expresssions | |
|---|---|---|
| # | Class Expresssion | Pred. Acc. |
| 1. | involvesMaterial only (MaterialProductBase or BottomPart) | 100.00% |
| 2. | hasPositionParam only (pos1 or pos2) | 100.00% |
| 3. | Thing | 40.82% |
| 4. | involvesMaterial max 1 Thing | 40.82% |
| 5. | involvesMaterial max 1 PartType3 | 40.82% |
| 6. | involvesMaterial max 1 PartType2 | 40.82% |
| 7. | involvesMaterial max 1 PartType1 | 40.82% |
| 8. | involvesMaterial max 1 HeadPart | 40.82% |
| 9. | involvesMaterial max 1 BottomPart | 40.82% |
| 10. | involvesMaterial max 1 MaterialProductBase | 40.82% |
| 11. | involvesMaterial max 1 zero | 40.82% |
| 12. | involvesMaterial max 1 pos5 | 40.82% |
| 13. | involvesMaterial max 1 pos4 | 40.82% |
| 14. | involvesMaterial max 1 pos3 | 40.82% |
| 15. | involvesMaterial max 1 pos2 | 40.82% |
| 16. | involvesMaterial max 1 pos1 | 40.82% |
| 17. | involvesMaterial max 1 hundredeighty | 40.82% |
| 18. | hasOrientationParam only (hundredeighty or zero) | 40.82% |
| 19. | pos1 or (involvesMaterial max 1 Thing) | 40.82% |
| 20. | hundredeighty or (involvesMaterial max 1 Thing) | 40.82% |

METHOD AND SYSTEM FOR SEMI-AUTOMATED GENERATION OF MACHINE-READABLE SKILL DESCRIPTIONS OF PRODUCTION MODULES

CROSS-REFERENCE TO RELATED APPLICATIONS

This application claims priority to European Patent Application No. 20171599.2, having a filing date of Apr. 27, 2020, the entire contents of which are hereby incorporated by reference.

FIELD OF TECHNOLOGY

The following relates to a method for semi-automated generation of a machine-readable skill description of a production module.

BACKGROUND

In many of today's production facilities, manufacturing machines are deterministically programmed allowing to fulfil one or more predefined tasks. This system works for mass production but cannot address requirements related to flexible manufacturing. Within the Industry 4.0 vision of smart factories, cyber-physical systems are promised to bring more flexibility, adaptability and transparency into production, increasing the autonomy of machines. In this context, manufacturing processes rely on formal skill descriptions in combination with formalized description of actions related to the single product production requirements. The term skill refers to the functionalities that a production machine provides. These skill descriptions are the basis for the control functionality of the production process and for fully utilizing the potential of dynamic manufacturing systems.

To realize cyber-physical systems in production, one approach is to equip machines with explicit digitized skill descriptions, detailing their capabilities. Having these skill descriptions in a digitized and therefore machine-readable format is necessary for further automation steps like skill matching, where explicit descriptions can be compared to production requests for deciding on the producibility of new product orders and assignment of production modules to production tasks. This method can simplify and speed up the production planning and execution. However, in some cases, these skill descriptions might not be available at all, e.g. in the case of a legacy module. Even for newer production equipment, skill descriptions, which can contain complex logical structures, might not be available in a digitized format.

Defining and digitalizing the skill descriptions of a production module are typically done manually by a domain expert. The domain expert analyzes and conceptualizes the structure of the production process with the respective production modules. Each production module has a specific set of skills and constraints, which must be documented. This process is very labor-intensive and requires a high expertise by the domain expert in order to fully understand the capabilities of a production module.

The objective of the skill descriptions is matching verification, in which certain product requirements should be met by the production module. One known approach is based on the notion that a bill of processes (BoP) for a product is available. This BoP is then matched against the functionality description of the production module. For example, the functionality "drilling" is described as the ability of the production module to execute this specific production process and is constrained by attributes like "depth" with their values. Another known approach concentrates on facilitating the feasibility check of product requirements, i.e. checking if a request can be fulfilled by a resource and reducing the production planning time.

Semantic technologies can provide formal description and semantic processing of data, therefore making the data interpretable with regard to its content and meaning. This explicit knowledge representation of the Semantic Web includes modeling of knowledge and application of formal logics over the knowledge base. One approach are ontologies, which enable the modeling of information and consist of classes, relations and instances. Class expression learning (CEL) is a subfield of inductive logic programming (ILP), where a set of positive and negative examples of individuals are given in an ontology, as described in Matthias Loskyll et al., "Context-based orchestration for control of resource-efficient manufacturing processes", Future Internet 4.3 (2012), pages 737-761. The supervised learning problem consists of finding a new class expression, such that most of the positive examples are instances of that concept, while the negatives examples are not, as described in Jens Lehmann et al., "Class expression learning for ontology engineering", Journal of Web Semantics 9.1 (2011), pages 71-81.

SUMMARY

An aspect relates to a method and system for semi-automated generation of machine-readable skill descriptions of production modules that speed up the process of generating skill descriptions.

According to the method for semi-automated generation of a machine-readable skill description of a production module, the following steps are executed by one or more processors:

processing knowledge stored in a knowledge storage with an inductive learning component, the inductive learning component performing class expression learning in order to create class expressions, with each class expression representing a constraint or property of a skill of the production module, ordering, by a metric, the class expressions, thereby forming an ordered recommender list, outputting, by a display of a user interface, the ordered recommender list to a user, receiving, by a user interface, one or more user interactions, the user interactions providing a selection of class expressions from the ordered recommender list, building the machine-readable skill description with the selected class expressions.

The system for semi-automated generation of a machine-readable skill description of a production module comprises a knowledge storage, a user interface with a display, and one or more processors programmed for executing the steps of:

processing knowledge stored in the knowledge storage with an inductive learning component, the inductive learning component performing class expression learning in order to create class expressions, with each class expression representing a constraint or property of a skill of the production module, ordering, by a metric, the class expressions, thereby forming an ordered recommender list, outputting, by the display of the user interface, the ordered recommender list to a user, receiving, by the user interface, one or more user interactions, the user interactions providing a selection of class expressions from the ordered recommender list, and building the machine-readable skill description with the selected class expressions.

The following advantages and explanations are not necessarily the result of the object of the independent claims. Rather, they may be advantages and explanations that only apply to certain embodiments or variants.

For example, the inductive learning component can be implemented with logic programming. Inductive logic programming (ILP) provides the kind of inductive reasoning that is needed. The inductive learning component can, for example, be a computer program that is executed by the one or more processors.

The method and system advantageously support resource-efficient production in dynamic production environments with flexible manufacturing machines and processes. By providing formal, machine-readable skill descriptions, they help to fully utilize this potential of dynamic manufacturing through automatic production planning. Compared to manual generation of skill description, this approach minimizes the labor time and domain expertise needed to equip production modules with their skill description. Selecting the correct class expression from the automatically generated ordered recommender list is a much lower effort than manual labeling from scratch.

Using class expression learning as a form of inductive machine learning has the advantage that the ordered recommender list fits the knowledge stored in the knowledge storage, for example instance data of previous operations and existing background knowledge. This means that schema and instances are developed in concordance and the entrance barrier for domain experts can be lower, since understanding and evaluating a skill description is easier than analyzing the structure of the production process and creating a skill description manually.

According to an embodiment of the method, the machine-readable skill description is stored in the knowledge storage.

This embodiment enriches the ontology in the knowledge storage.

According to an embodiment of the method, the processed knowledge contains at least instance data of operations previously carried out by the production module and/or other production modules, and an ontology containing at least a class hierarchy of several production modules as well as parameters of at least some of those production modules.

This embodiment advantageously utilizes production logs (containing the instance data) and industrial ontologies through inductive logic programming in order to create the class expressions. These production logs together with industrial ontologies are the basis for and make it possible to learn the skill descriptions. Advantageously, typically available production logs can be exploited.

According to an embodiment of the method, the metric is predictive accuracy.

According to an embodiment of the method, the one or more processors use the machine-readable skill description for automated skill matching in a flexible production environment, and automatically create a production plan by assigning several production modules to production orders.

According to an embodiment of the method, the one or more processors automatically execute the production plan in order to produce a product.

The flexible production environment comprises production modules and the system. One or more processors of the flexible production environment are programmed to use the machine-readable skill description for automated skill matching in the flexible production environment, and automatically create a production plan by assigning several production modules to production orders.

According to an embodiment, the flexible production environment is configured for automatic execution of the production plan and production of a product.

The computer-readable storage media have stored thereon instructions executable by one or more processors of a computer system, wherein execution of the instructions causes the computer system to perform the method.

The computer program is being executed by one or more processors of a computer system and performs the method.

BRIEF DESCRIPTION

Some of the embodiments will be described in detail, with reference to the following figures, wherein like designations denote like members, wherein:

FIG. 4 depicts a class expression recommender list.

DETAILED DESCRIPTION

In the following description, various aspects of the present invention and embodiments thereof will be described. However, it will be understood by those skilled in the art that embodiments may be practiced with only some or all aspects thereof. For purposes of explanation, specific numbers and configurations are set forth in order to provide a thorough understanding. However, it will also be apparent to those skilled in the art that the embodiments may be practiced without these specific details.

Figure 1:
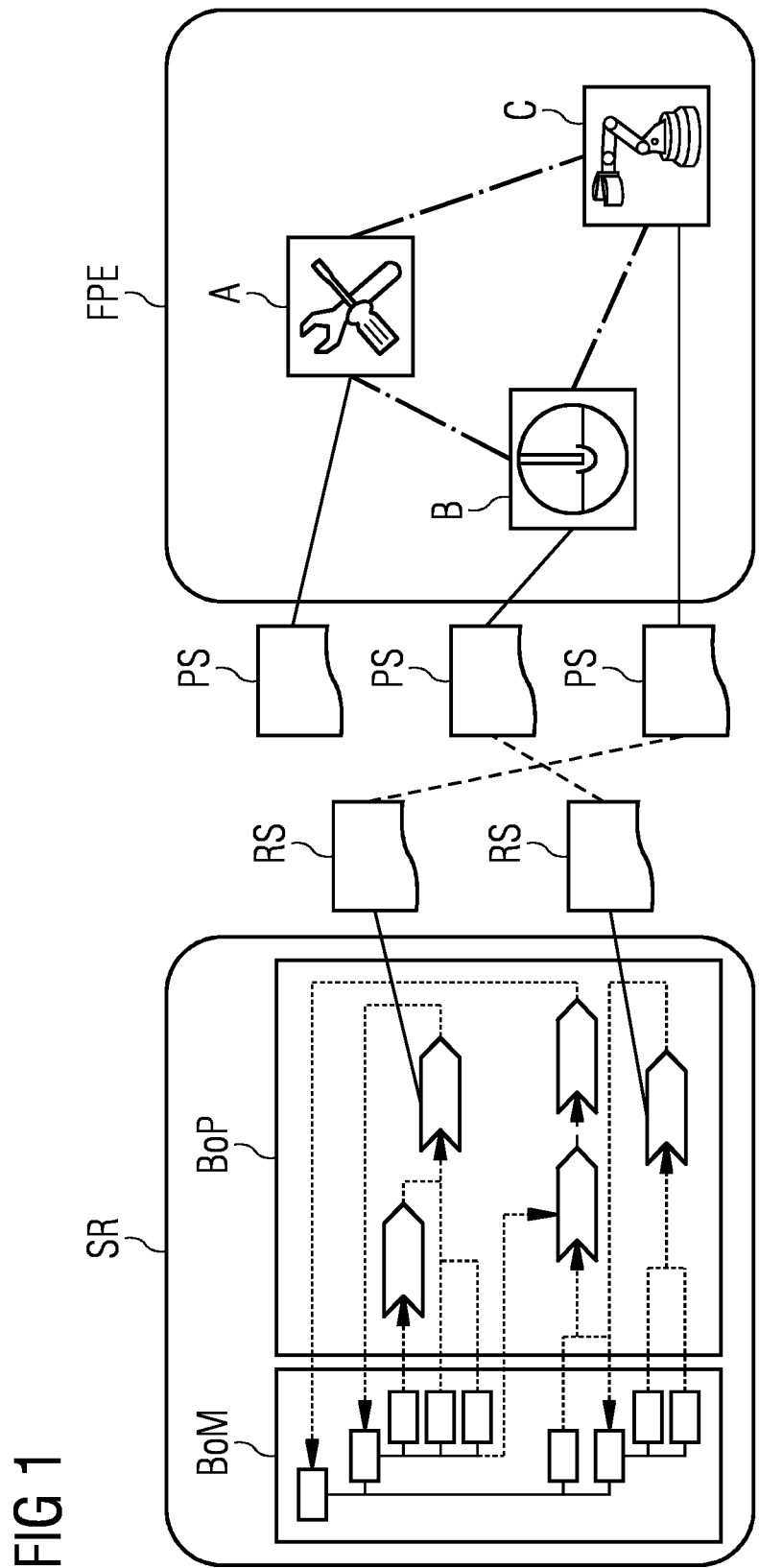
FIG. 1 depicts a skill matching process in a flexible production environment.

FIG. 1 shows a skill matching process in a flexible production environment FPE. The flexible production environment FPE consists of one or more production lines with a number of production modules A, B, C, which are for example production machines or parts thereof. These production modules A, B, C have a set of provided skills PS, for which we want to learn their descriptions. The production orders consist of a bill of materials BoM and a bill of processes BoP which are used for the automatic production planning—production steps are assigned to specific production modules A, B, C and scheduled for a certain time within a specific production plan. This enables an efficient production process and allocation of resources.

Part of this process is skill matching as shown in FIG. 1, where skill requirements SR, in particular required skills RS, of a certain operation are matched to skill offers, in particular provided skills PS, of the production modules A, B, C. For example, manufacturing process step two, requires an intermediate product, created in step one and one more material as seen in the bill of materials BoM and a bill of processes BoP. These two parts have to be joined which requires a joining skill of a production module. A third production module C offers this skill, and the required skill RS and provided skill PS can be matched. However, this requires the provided skill PS of the third production module C to be available in a digital format, to make a successful skill matching possible.

In the following, an approach for learning ontology-based skill descriptions will be described. This approach is part of a possible embodiment of the method for semi-automated generation of machine-readable skill descriptions of production modules.

In order to exemplify the skill description learning process, we chose one example skill "AssembleItemByModuleA" carried out by a specific production module, assembling of an item by a first production module A. Here, one item or material is assembled onto another item by the first production module A. Other skills that could be looked at include joining, charging dismantling, recycling, etc. In this context, an ontology is used that provides:

1) A class hierarchy of all the production modules, materials, etc. All classes that are relevant to the production process are modelled here.
2) Instances of operation carried out by the production module. These are the production logs, modelled in the ontology, and can be used by inductive logic programming. Inductive logic programming is a subfield of machine learning that uses first-order logic to represent hypotheses, in this case with production logs and ontologies as input.
3) Object properties as background knowledge of each single operation instance. These are properties of the skill descriptions we want to learn. The properties are used to assert relationships between individuals, for example, an operation instance "I-017573-ex" has the object property Position Parameter "PositionParam" of "Position 1". Another instance of this operation has the Position Parameter of "Position 2". Therefore, our algorithm should find a class expression, that expresses that the position parameter of our operation has Position Parameter "Position 1" or "Position 2".

The ground truth for a skill description for the skill "AssembleItemByModuleA" example is comprised of three "class expression"-like statements or constraints and is generated manually by a domain expert as OWL constraints:

Material involved has to be "MaterialProductBase" or "BottomPart"

Object has Position Parameter "Position 1" or "Position 2"

Object has Orientation Parameter "hundredeighty" or "zero".

The problem of learning skill descriptions can be formulated as followed. We represent log data of the production processes as instance data I and ontologies as modelled background data B containing machine and product parameters, with instance data and background data constituting knowledge base K. $A_{total}$ represents the ground truth skill description. The skill description $A_{learned}$ is a combination of learned class expressions $A_i$, with $$A_{learned} = \{A_1, \ldots, A_n\},$$

where each class expression $A_i$ represents a constraint or a property of the skill. $A_{learned}$ is a subset of C, with C being a list of possible class expressions $C_i$ for a production module created by inductive logic programming. In the next step a domain expert can decide which class expressions $C_i$ are most appropriate, based on key indicators. The selected class expressions together constitute a skill description, so result constitutes a conjunction of class expressions $C_{selected}$ such that $$C_{selected} = A_{learned}$$

The data used for learning the class expressions $C_i$ is captured by semantic web technology, more specifically by ontologies describing cyber-physical systems. This background knowledge represents domain knowledge about the equipment of a production plant, products and their production requirements, materials and production processes.

Figure 2:
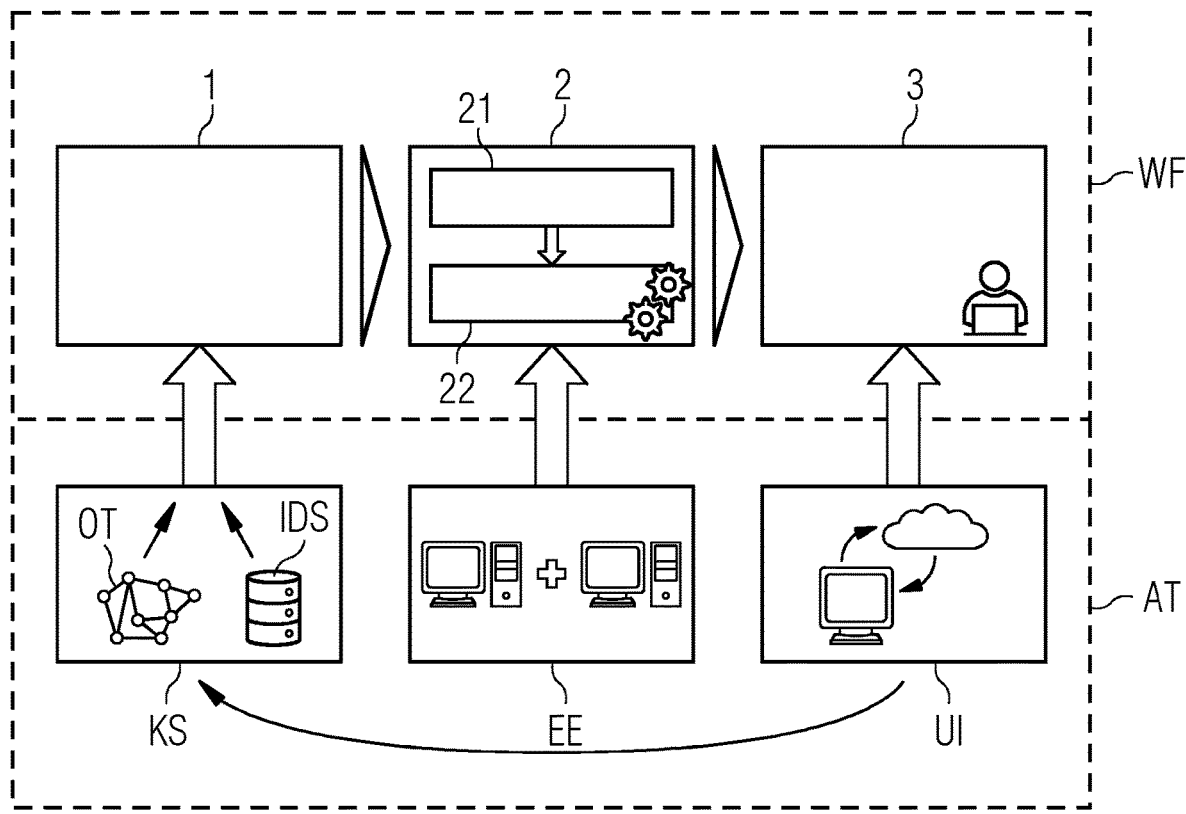
FIG. 2 depicts a flowchart of a possible exemplary embodiment of a method and system for semi-automated generation of machine-readable descriptions of skills of production modules.

FIG. 2 shows a workflow WF of a possible exemplary embodiment of the method as well as an architecture AT of a possible exemplary embodiment of the system. According to the embodiment, the workflow WF is subdivided into three processing steps or building blocks: a preprocessing step 1, followed by a recommender step 2 and a postprocessing step 3.

The preprocessing step 1 contains the preparation of the instance data I (example data), which is resulting from the log data. Each instance data is an individual in our knowledge base K, i.e. an operation carried out by the specific production module as can be seen in the following example:

"op": "I-017573-ex"
"machine": "ModuleA"
"skill": "AssembleItemByModuleA"
"duration": 20

In other words, information captured by the log data include the operation ID, the machine carrying out the operation, the skill name and the operation duration.

Figure 3:
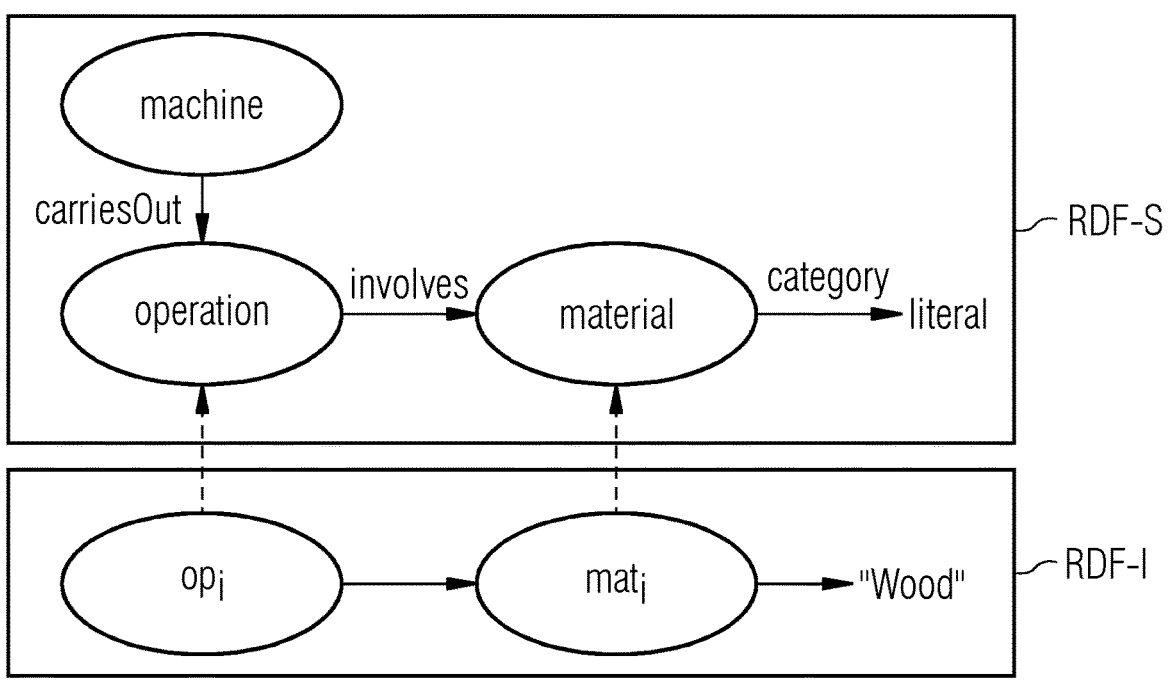
FIG. 3 depicts a RDF schema and instance example.

In order to achieve meaningful class expressions C, the individuals in the ontology need to be equipped with background knowledge. An example for background knowledge would be information detailing the operation in the production process, such as the material involved as seen in FIG. 3. The learned class expression given by the class expression learner, has OWL Manchester Syntax:

involvesMaterial only (MaterialProductBase or BottomPart1)

The Manchester OWL syntax is a user-friendly syntax for OWL Description Logics, fundamentally based on collecting all information about a particular class, property, or individual into a single construct, as described in Matthew Horridge and Peter F Patel-Schneider, "Manchester Syntax for OWL 1.1.", in: OWLED (Spring), Citeseer, 2008. This background knowledge is modelled in an ontology as seen described above. For a successful class expression learning, a high quality of the ontology is needed. Modelling errors, i.e. missing or wrongly assigned background knowledge, can lead to a reduced quality of the final skill descriptions. For example, an operation instance assigned to the wrong skill name could lead to erroneous class expressions.

The architecture AT provides a knowledge storage KS that includes at least one ontology OT holding background knowledge as well as an instance data storage IDS. As an alternative, the instance data can be part of the ontology OT.

The recommender step 2 contains a creation step 21 for creating class expressions through inductive machine learning, and an ordering step 22 for ordering the class expressions by a metric. The creation step 21 forms the machine learning part of the workflow and uses inductive logic programming as a search process, which takes operations carried out by the production module we want to describe as positive examples (instance data I) and creates and tests class expressions C against a background knowledge base B.

The ordering step 22 keeps the approach efficient, since the collection of most fitting class expressions $R_K(C) = R_K(A)$ should be found on top of a recommender list that is generated by the process. The ordering of the class expressions is done by predictive accuracy.

The algorithm of the recommender step 2 can be implemented within the open-source framework DL-Learner, which can be used to learn classes in OWL ontologies from selected objects. It extends inductive logic programming to descriptions logics and the semantic web, as described in Lorenz Bühmann, Jens Lehmann, and Patrick Westphal, "DL-Learner—A framework for inductive learning on the Semantic Web", in: Journal of Web Semantics 39 (2016), pages 15-24. Based on existing instances of an OWL class, DL-Learner can make suggestions, i.e. generate class expressions for class descriptions. For example, instances from "Operation1", subclass to "AssembleItemByModuleA", are the basis for its class description. The standard algorithm for class expression learning, namely CELOE, can be used.

On the side of the architecture AT, the creation step 21 and the ordering step 22 are performed by one or more execution engines EE. The steps can be executed by the same or different execution engines. The execution engines can be processors such as a microcontroller or a microprocessor, or an Application Specific Integrated Circuit (ASIC), or any kind of computer, including mobile computing devices such as tablet computers, smartphones or laptops, or one or more servers in a control room or cloud.

The postprocessing step 3 involves a domain expert, who chooses the class expressions C from the recommender list according to a set of predefined key indicators including completeness, accuracy and human-understandability. The final skill description A is saved to the knowledge storage (KS) and can then be used in further flexible manufacturing processes like skill matching.

On the side of the architecture AT, a user interface UI allows the domain expert to make his selections.

FIG. 3 shows an example of an RDF schema RDF-S and its corresponding RDF instance RDF-I. This in an illustration of background knowledge detailing the operation in the production process, such as the material involved.

FIG. 4 shows a recommender list RL as generated during the recommender step 2 described for FIG. 2. The recommender list RL contains class expressions for the AssembleItemByModuleA skill. The class expressions number 1, 2, and 18 are the ground truth and can all be found in the top 20 results. However, some of the other class expressions have very little or no useful information. For example, class expression number 5 "involvesMaterial max 1 PartType3" is not wrong, in that no material of type PartType3 is used in this skill. But including this class expression in the skill description would not add any value to a concise and complete description and could diminish skill description understandability. That is why a domain expert is still needed, to discern between the useful and useless class expressions to generate a complete skill description. To do so, the domain expert has to evaluate all 20 class expressions and choose a subset based on their content and style for the final skill description.

The method can be executed by one or more processors such as a microcontroller or a microprocessor, by an Application Specific Integrated Circuit (ASIC), by any kind of computer, including mobile computing devices such as tablet computers, smartphones or laptops, or by one or more servers in a control room or cloud. For example, a processor, controller, or integrated circuit of the computer system and/or another processor may be configured to implement the acts described herein.

The above-described method may be implemented via a computer program product (non-transitory computer readable storage medium having instructions, which when executed by a processor, perform actions).

The instructions for implementing processes or methods described herein may be provided on non-transitory computer-readable storage media or memories, such as a cache, buffer, RAM, FLASH, removable media, hard drive, or other computer readable storage media. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

The present invention has been described in detail with reference to embodiments thereof and examples. Variations and modifications may, however, be effected within the spirit and scope of the present invention. The phrase "at least one of A, B and C" as an alternative expression may provide that one or more of A, B and C may be used.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A method for semi-automated generation of a machine-readable skill description of a production module of a flexible production environment comprising a plurality of production lines with one or more production modules each having a set of provided skills, the method comprising:
   one or more processors executing the steps of:
   processing knowledge stored in a knowledge storage with an inductive learning component, the inductive learning component performing class expression learning to create class expressions, with each class expression representing a constraint or property of a skill of the production module, wherein the processed knowledge contains at least:
   instance data of operations previously carried out by the production module and/or other production modules; and
   an ontology containing at least a class hierarchy of several production modules and parameters of at least some of the production modules;
   ordering, by a metric, the class expressions, thereby forming an ordered recommender list;
   outputting, by a display of a user interface, the ordered recommender list to a user;
   receiving, by the user interface, one or more user interactions, the user interactions providing a selection of class expressions from the ordered recommender list;
   building the machine-readable skill description with the selected class expressions for the set of provided skills of at least one production module;
   storing the machine-readable skill description in the knowledge storage to enrich the knowledge storage;
   as a function of building the machine-readable skill description for the set of provided skills of at least one production module, matching the set of provided skills with a set of required skills of a manufacturing operation;

in response to the matching, automatically creating a production plan by assigning one or more production steps of the manufacturing operation to the at least one production module as part of the production plan; and automatically executing the production plan by controlling the at least one production module to produce a product.

2. The method according to claim 1, wherein the machine-readable skill description is stored in the knowledge storage.

3. The method according to claim 1, wherein the metric is predictive accuracy.

4. A system for semi-automated generation of a machine-readable skill description of a production module having a set of provided skills, the system comprising:

a knowledge storage, a user interface with a display, and one or more processors configured to:

process knowledge stored in the knowledge storage with an inductive learning component, the inductive learning component performing class expression learning to create class expressions, with each class expression representing a constraint or property of a skill of the production module, wherein the processed knowledge contains at least:

instance data of operations previously carried out by the production module and/or other production modules; and an ontology containing at least a class hierarchy of several production modules and parameters of at least some of the production modules;

order, by a metric, the class expressions, thereby forming an ordered recommender list;

output, by the display of the user interface, the ordered recommender list to a user;

receive, by the user interface, one or more user interactions, the user interactions providing a selection of class expressions from the ordered recommender list;

build the machine-readable skill description with the selected class expressions for the set of provided skills of the production module;

store the machine-readable skill description in the knowledge storage to enrich the knowledge storage;

as a function building the machine-readable skill description for the set of provided skills of at least one production module, match the set of provided skills with a set of required skills of a manufacturing operation;

in response to the matching, automatically create a production plan by assigning one or more production steps of the manufacturing operation to the production module as part of the production plan; and execute the production plan by controlling the production module to produce a product.

5. A non-transitory computer-readable storage media having stored thereon:

instructions executable by the one or more processors of a computer system, wherein execution of the instructions causes the computer system to perform the method according to claim 1.

6. A computer program, which is being executed by the one or more processors of a computer system and performs the method according to claim 1.

* * * * *